Jan. 24, 1967  R. OLSEN  3,299,851
SIGHTGLASS CONSTRUCTION
Filed July 6, 1964
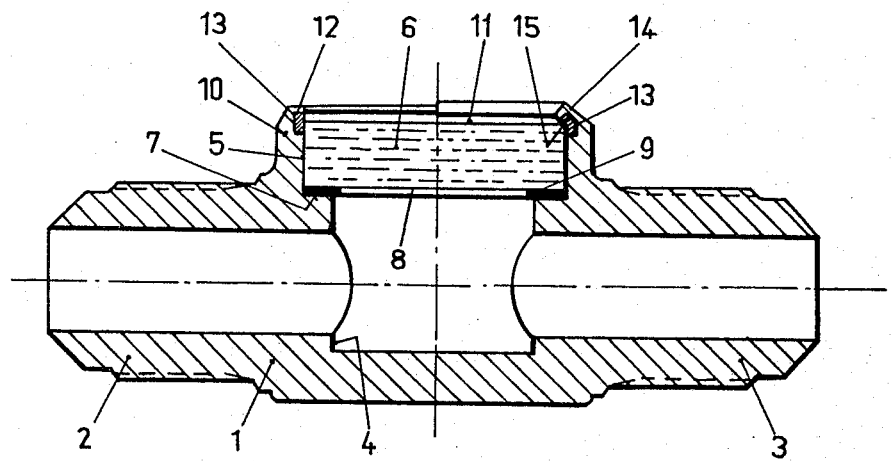

United States Patent Office 3,299,851
Patented Jan. 24, 1967

3,299,851
SIGHTGLASS CONSTRUCTION
Robert Olsen, Nordborg, Denmark, assignor to Danfoss A/S, Nordborg, Denmark, a company of Denmark
Filed July 6, 1964, Ser. No. 380,464
Claims priority, application Germany, Aug. 16, 1963, D 42,249
2 Claims. (Cl. 116—117)

This invention relates generally to inspection apparatus and more particularly to a sightglass construction.

In known inspection devices comprising sightglasses the devices are constructed so that the sightglass or inspection glass is secured by a flange or rim on the casing or housing of the inspection glass. The glass is pressed against a seal by the rim. The seal is generally disposed on a casing annular surface or seat on the sightglass housing. In order to effect a permanent seal even though the glass is held by the rim or flange, there is always a danger that the contact pressure of the flange or rim is not sufficient in which case the sightglass will leak or will eventually loosen. On the other hand, if the pressure is too great, there is a possibility that the sightglass itself might be damaged.

A principal object of the present invention is to provide a simple and inexpensive sightglass construction which is permanently fluidtight.

A feature of the invention is the provision of an annular sealing element for the outer edge. The annular sealing element, moreover, functions as a protective device between the sightglass and an annular flange rim securing the glass in position and biasing it in a direction for effecting a seal against an inner annular seal seating surface. The seal on the outer edge is resilient and provides a cushion to allow greater pressure to be applied by the securing flange or rim to the glass to the seal.

Another feature of the invention is the provision of an annular seal applied as a seat compound which is hardenable to form the inner seal of the glass. The outer, annular seal ring, moreover, allows a sufficient pressure to be applied by the outer rim seating the glass during the hardening of the inner seat compound so that a permanent, effective seal is established and maintained.

Other features and advantages of the sightglass in accordance with the present invention will be better understood as described in the following specification and appended claims, in conjunction with the drawing which is a longitudinal, section view of a sightglass construction according to the invention.

According to the drawing, a sightglass construction comprises a casing member 1 provided with tubular extensions or portions 2, 3, for example threaded tubular portions to which conduits, through which the fluid to be viewed passes, are attached to the sightglass casing or holder. The casing is provided with an axial passageway or through bore defining a flow-path through which the fluid flows. The instant sightglass according to the invention is applied to viewing a fluid such as a refrigerant. The casing 1 is provided with a cylindrical bore normal to the axial passageway and open at one end. The cylindrical bore comprises a minor internal diameter 4 and a major diameter 5. The major diameter portion of the bore is dimensioned to receive a sightglass 6 that is seated on a seat or annular surface 7 formed circumferentially of the open end of the cylindrical bore as a shoulder between the two bore portions of different diameters and on which a hardenable sealing compound forms an inner seal as hereinafter explained.

The sightglass is provided with an inner surface 8 in contact with the fluid passing through the casing. An annular inner seal 9 is formed extending circumferentially about the marginal edge surface of the inner surface 8. The major diameter portion of the cylindrical bore is formed as an annular ring 10 integral with the body portion 1 and in which is formed an annular recess 12 for receiving a resilient annular ring 13 in position so that an upper face 11 of the sightglass is aligned substantially with the center of the ring 13. The sightglass permits viewing the flow through the central opening of the annular portion 10. The resilient ring 13 seals along two annular surfaces of the sightglass in conjunction with an inwardly turned rim or flange of the portion 10 as later explained.

The annular portion 10 is provided with a deformable annular flange defining the annular slot 12 which can be deformed downwardly as illustrated in the right-hand side of the drawing to form a rim 14 flared generally, radially inwardly in a tapered position bending the resilient ring 13 over the upper, peripheral edge 15 of the sightglass 6 as illustrated so that a portion thereof overlies an annular marginal edge portion of the sightglass and another portion extends on a marginal or upper side surface edge thereof as illustrated.

The seal 9 is formed by applying a sealtight hardenable compound, for example a compound of the trade name "Lock-Tite," on which the glass is seated and the flange or rim 14 is formed to the position illustrated to hold the glass in position on the hardenable compound during the hardening thereof to form an effective, permanent seal. The upper or outer seal ring 13 as illustrated permits a considerable amount of pressure to be applied by the rim 14 to the sightglass tending to seat it tightly on the inner seal ring 9. This pressure is greater than would otherwise be possible if the ring 13 was not provided in the position illustrated.

Those skilled in the art will recognize that the resilient seal ring 13 allows a greater pressure to be applied and, moreover, functions as an effective seal itself and holds the sightglass 6 against the sealed disc 9 with the necessary contact pressure and the glass axially and radially in position within the annular portion 10.

While a preferred embodiment of the invention has been shown and described, it will be understood that many modifications and changes can be made within the scope of the invention.

What I claim and desire to secure by Letters Patent is:

1. A sightglass device for viewing flow along a flowpath, said device comprising a casing, a sightglass in said casing for viewing in operation fluid flow along said flow-path, said casing having an annular portion confining said sightglass and defining a seat for said sightglass and having a central opening for viewing fluid flow through said sightglass, said annular portion of said casing including a pressure-applying flange biasing said sightglass in a direction toward said seat, said flange being integral with said annular portion of said casing, an integral resilient ring disposed peripherally about and abutting directly against a marginal edge portion of said sightglass, said flange being inwardly bent over and pressing directly against said resilient ring thereby to urge said resilient ring directly against the marginal edge portion of the sightglass, whereby a fluidtight seal between said sightglass and said pressure-applying flange is defined.

2. The combination according to claim 1, in which said means defining said flow-path comprises means having a through bore and a cylindrical bore normal to said through bore and open at one end, said sightglass being disposed closing said one end of said cylindrical bore, said seat being disposed circumferentially of said one end of said cylindrical bore, a sealing compound between said seat and a major inner face surface of said sightglass.

References Cited by the Examiner

UNITED STATES PATENTS

| 2,811,128 | 10/1957 | Franck | 73—323 X |
| 2,946,156 | 7/1960 | Bailey | 116—117 X |

FOREIGN PATENTS 1,107,409 5/1961 Germany.

LOUIS R. PRINCE, *Primary Examiner.*

D. M. YASICH, *Assistant Examiner.*